US009722643B2

United States Patent
Ke et al.

(10) Patent No.: US 9,722,643 B2
(45) Date of Patent: Aug. 1, 2017

(54) ENHANCED ECHO CANCELLATION IN FULL-DUPLEX COMMUNICATION

(71) Applicant: Lattice Semiconductor Corporation, Portland, OR (US)

(72) Inventors: Jiandong Ke, Shanghai (CN); Kai Lei, Shanghai (CN); Yi Gao, Shanghai (CN); Qi Zhou, Shanghai (CN); Qiming Wu, Shanghai (CN); Kai Zhou, Shanghai (CN)

(73) Assignee: Lattice Semiconductor Corporation, Portland, OR (US)

( * ) Notice: Subject to any disclaimer, the term of this patent is extended or adjusted under 35 U.S.C. 154(b) by 173 days.

(21) Appl. No.: 14/651,203

(22) PCT Filed: Jan. 5, 2015

(86) PCT No.: PCT/CN2015/070081
§ 371 (c)(1),
(2) Date: Jun. 10, 2015

(87) PCT Pub. No.: WO2016/109915
PCT Pub. Date: Jul. 14, 2016

(65) Prior Publication Data
US 2016/0285483 A1 Sep. 29, 2016

(51) Int. Cl.
*H04B 1/40* (2015.01)
*H04B 1/04* (2006.01)
(Continued)

(52) U.S. Cl.
CPC ............. *H04B 1/0475* (2013.01); *H04B 1/40* (2013.01); *H04B 3/23* (2013.01); *H04L 5/14* (2013.01)

(58) Field of Classification Search
CPC .......... H04B 1/04; H04B 1/0475; H04B 1/10; H04B 1/38; H04B 1/40; H04B 3/00;
(Continued)

(56) References Cited

U.S. PATENT DOCUMENTS 5,828,657 A * 10/1998 Betts .................. H04B 3/238
370/269
6,810,076 B1 10/2004 Tang et al.
(Continued)

FOREIGN PATENT DOCUMENTS

| CN | 1476180 A | 2/2004 |
|---|---|---|
| CN | 102067571 A | 5/2011 |
| WO | WO 2013/166080 A1 | 11/2013 |

OTHER PUBLICATIONS

PCT International Search Report and Written Opinion, PCT Application No. PCT/CN2015/070081, Sep. 30, 2015, 11 pages.

*Primary Examiner* — Shawkat M Ali
(74) *Attorney, Agent, or Firm* — Fenwick & West LLP

(57) ABSTRACT

Embodiments relate to enhancing echo cancellation in a transceiver integrated circuit (IC) for full-duplex communication by providing a signal path connected to a dummy driver that replicates a signal path between a main driver and a counterpart transceiver IC to cause a duplicated signal generated by the dummy driver to more closely replicate a sending signal generated by the main driver. The signal path connected to the dummy driver includes circuit elements having transmission line parameters and RLC parameters that replicate transmission line parameters and RLC parameters of circuit elements in the signal path between the main driver and the counterpart transceiver IC.

20 Claims, 9 Drawing Sheets

(51) Int. Cl.
*H04B 3/23* (2006.01)
*H04L 5/14* (2006.01)

(58) Field of Classification Search
CPC .. H04B 3/20; H04B 7/015; H04L 5/14; H04L 5/16; H04L 12/26; H04L 23/00; H04L 25/08; H04M 1/00; H04M 9/00
USPC ............... 330/116; 370/249, 276, 286, 289; 375/219, 220, 257, 285, 296, 346; 379/391

See application file for complete search history.

(56) References Cited

U.S. PATENT DOCUMENTS

| | | | |
|---|---|---|---|
| 6,965,578 B1 * | 11/2005 | Kappes | H04B 3/23 370/286 |
| 6,980,644 B1 * | 12/2005 | Sallaway | H04M 9/082 379/391 |
| 8,737,278 B1 * | 5/2014 | Yang | H04B 3/20 370/286 |
| 2004/0120391 A1 * | 6/2004 | Lin | H04L 5/1423 375/219 |
| 2004/0247022 A1 * | 12/2004 | Raghavan | H04L 5/08 375/219 |
| 2005/0232170 A1 * | 10/2005 | Chiu | H04L 5/1461 370/276 |
| 2013/0329828 A1 * | 12/2013 | Lee | H04B 7/015 375/285 |

* cited by examiner

ENHANCED ECHO CANCELLATION IN FULL-DUPLEX COMMUNICATION

BACKGROUND

1. Field of Art

The present disclosure relates to cancelling echo in full-duplex communication, and more specifically to using dummy pins and circuit elements dummy drivers and a termination in a full-duplex transceiver to cancel echo more effectively.

2. Description of the Related Art

Full-duplex communication is used widely in networks to transmit signals in both directions on a same signal path simultaneously. Transceivers for full-duplex communication are provided at two communicating devices. Each transceiver sends its signal over the same path while also extracting a signal sent from a counterpart transceiver over the same path. Because signals are sent to and from each receiver simultaneously, full-duplex communication enables efficient communication between devices in the networks.

One of many challenges in implementing in transceivers for full-duplex communication is echo cancellation. Echo cancellation is a scheme that cancels out a sending signal in the transceiver to extract a receiving signal. In many implementations, a degree of cancellation residual error remains, which becomes pronounced in high-speed and long-cable applications. Such residual error increases errors in the extracted signal.

SUMMARY

Embodiments relate to a full-duplex transceiver including an integrated circuit package with a first pad coupled to a first driver and a second pad coupled to a second driver. The first driver receives a digital signal from a data input circuit and generates a first signal to a first pad according to the received digital signal. The first pad is coupled to a communication channel between the full-duplex transceiver and a counterpart full-duplex transceiver via first components. The second driver receives the digital signal and generates a second signal corresponding to the first signal to a second pad according to the received digital signal. The second pad is coupled to a termination in the full-duplex transceiver via second components.

In one embodiment, the first components includes conductive element between the first pad and a first pin of the integrated circuit package, and the second components includes conductive element between the second pad and the second pin of the integrated circuit package.

In one embodiment, the first components further includes a first printed circuit board (PCB) trace, first passive circuit elements connected to the first PCB trace and a connector between the first passive circuit elements and the communication channel. The second components further includes a second printed circuit board (PCB) trace, second passive circuit elements between the second PCB trace and the termination.

In one embodiment, a transmission line parameter and a RLC parameter of the termination are same as a transmission line parameter and a RLC parameter of a termination in an integrated package of a counterpart full-duplex transceiver connected to a driver of the counterpart full-duplex transceiver corresponding to the first driver of the full-duplex transceiver.

In one embodiment, each of the first and second passive circuit elements includes at least one of an electrostatic discharge protection circuit, and a common mode choke (CMC) circuit.

In one embodiment, an equalizer is coupled to the output of the echo cancellation circuit. The equalizer (i) compensates for attenuation of a receiving signal included in the difference signal and (ii) provides a compensated version of the receiving signal to a data output circuit.

In one embodiment, the data input circuit includes a serializer and the data output circuit includes a de-serializer.

In one embodiment, each of the first driver and the second driver includes differential outputs.

In one embodiment, a negative output of the first driver and a negative output of the second driver are placed between a positive output of the first driver and a positive output of the second driver.

In one embodiment, a positive output of the first driver and a positive output of the second driver are placed between a negative output of the first driver and a negative output of the second driver.

Embodiments also relate to a method of performing full-duplex communication, where a first driver transmits a first signal to a first pad and s second driver transmits a second signal to a second pad. The first and second drivers receive a digital signal from a data input circuit. The first signal is transmitted from the first pad to a communication channel between the full-duplex transceiver and a counterpart full-duplex transceiver via first components in the full-duplex transceiver. The second signal is transmitted from the second pad to a termination in the full-duplex transceiver. A difference signal representing a voltage difference between the first pad and the second pad is generated by an echo cancellation circuit.

DETAILED DESCRIPTION OF EMBODIMENTS

Figure 1:
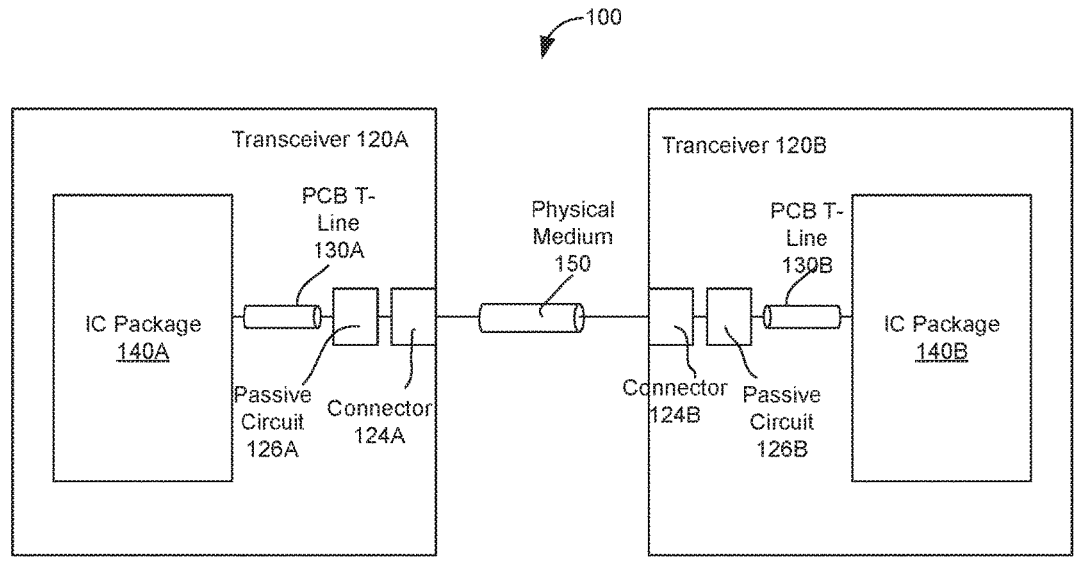
FIG. 1 is a block diagram illustrating a full-duplex communication system, according to one embodiment.

Embodiments are described herein with reference to the accompanying drawings. Principles disclosed herein may, however, be embodied in many different forms and should not be construed as being limited to the embodiments set forth herein. In the description, details of well-known features and techniques may be omitted to avoid unnecessarily obscuring the features of the embodiments.

In the drawings, like reference numerals in the drawings denote like elements. The shape, size and regions, and the like, of the drawing may be exaggerated for clarity.

Embodiments relate to enhancing echo cancellation in a transceiver integrated circuit (IC) for full-duplex communication by providing a signal path connected to a dummy driver that replicates a signal path between a main driver and a counterpart transceiver IC. The signal path connected to the dummy driver includes circuit elements having transmission line parameters and RLC parameters that replicate transmission line parameters and RLC parameters of circuit elements in the signal path between the main driver and another main driver in the counterpart transceiver IC. The signal path for signal from both the main driver and the dummy driver have the same properties, and therefore, a duplicated signal generated by the dummy driver better matches the signal generated by the main driver. By generating a duplicated signal at the dummy driver that better matches the sending signal of the main signal, an error between the duplicated signal and the sending signal can be reduced. Hence, a more accurate receiving signal can be extracted at the transceiver IC.

A circuit element described herein refers to any electronic components used for transmitting a signal from a signal source to a signal sink. Example circuit elements may include, resistors, capacitors, inductors, printed circuit board (PCB) traces, and passive electronic circuits (e.g., electrostatic discharge (ESD) circuit).

FIG. 1 is a block diagram illustrating a full-duplex communication system 100, according to one embodiment. Full-duplex communication system 100 may include, among other components, a transceiver 120A, a counterpart transceiver 120B, and a physical medium 150 between the two transceivers 120A, 120B. The physical medium 150 may be embodied as a cable including twisted pairs of conductors. The transceivers 120A, 120B send and receive signals over the same physical medium 150.

Transceiver 120A may be a part of an electronic device that sends and receives signals over the physical medium 150. The transceiver 120A may include, for example, a transceiver IC package 140A, printed circuit board (PCB) transmission line (T-line) 130A, a passive PCB circuit 126A and a connector 124A. The transceiver IC package 140A includes circuit components for processing the receiving and sending signals, as described below in detail with reference to FIG. 2. PCB T-line 130A connects the transceiver IC package 140A to the passive PCB circuit 126A and then to connector 124A. Passive PCB circuit 126 is a circuit provided outside transceiver IC package 140A for various purposes such as electrostatic discharge (ESD) circuit and common mode choke (CMC) circuit. Connector 124A connects transceiver 120A to physical medium 150.

Transceiver 120B may be part of another electronic device that communicates with the electronic device including transceiver 120A. Transceiver 120B includes components (e.g., transceiver IC package 140B, printed circuit board (PCB) transmission line (T-line) 130B, a passive PCB circuit 126B and a connector 124B) that perform substantially the same function as the components of transceiver 120A.

Figure 2:
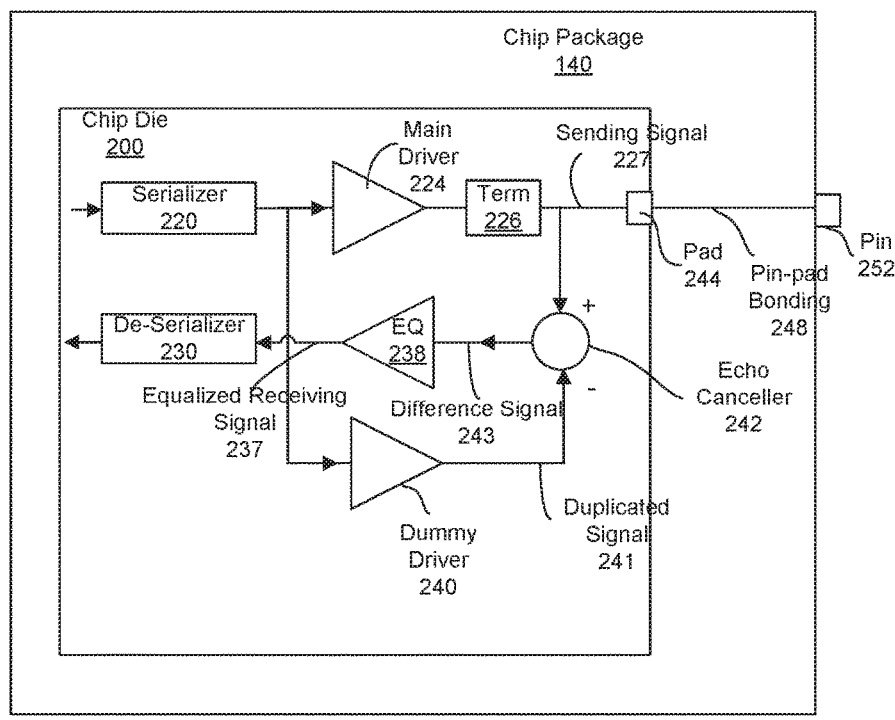
FIG. 2 is a block diagram of a transceiver integrated circuit (IC) package in a transceiver for performing full-duplex communication of FIG. 1, according to one embodiment.

FIG. 2 is a block diagram of an integrated circuit (IC) package 140 in transceivers 120A, 120B for performing full-duplex communication, according to one embodiment. IC package 140 may include a chip die 200, pin-pad bonding 248, and a pin 252. Chip die 200 is manufactured using a semiconductor fabrication process and performs operations to associated with the full-duplex communication. Chip die 200 is connected to pin 252 via conductive pin-pad bonding 248 and a PCB trace (not shown) in chip package 140. Although only a single pin 252 is illustrated in FIG. 2, a typical chip package 120 includes multiple pins for transmitting or receiving various data or receiving supply voltage. In one embodiment, a ball grid array (BGA) routing can be used in place of pin-pad bonding 248.

Chip die 200 includes circuits for embodying a full-duplex communication circuit with an echo cancellation feature. Chip die 200 may include, among other components, a serializer 220, a de-serializer 230, a main driver 224, a dummy driver 240, termination 226, an equalizer 238, an echo canceller 242, and a pad 244. Serializer 220 is a circuit that receives input data for transmitting from chip package 140 in a device to another device over physical medium 150. The input data may be received from another circuit in the device via a pin and pad of the chip package 140 (not illustrated).

Serializer 220 serializes the input data and sends the serialized data to main driver 224 and dummy driver 240. Main driver 224 generates a sending signal 227 that causes the voltage at pad 244 connected via termination 226 to increase or decrease according to the serialized input data. The voltage level at pad 224 is determined in accordance with the voltage change of sending signal 227 as well as voltage change of receiving signal sent from the other electronic device. In other embodiment, other data input circuits other than serializer 220 may be used.

Sending signal 227 is transmitted to other components in the transceiver 120A via a pad 244 and a pin connected to pad 244 via conductive pin-pad bonding 248 and a PCB trace (not shown) in chip package 140.

Dummy driver 240, echo canceller 242 and equalizer 238 operated collectively to detect the receiving signal sent from the other electronic device. The serialized input data from serializer 220 is also fed to dummy driver 240 to generate a duplicated signal 241 that is substantially the same as sending signal 227 generated by main driver 224. Sending signal 227 and the duplicated signal 241 are both fed to echo canceller 242.

Echo canceller 242 generates a difference signal $V_{243}$ indicating a voltage difference between sending signal 227 and duplicated signal 241. Difference signal $V_{243}$ includes an attenuated version of receiving signal sent from the other device as well as an error signal representing the different between sending signal 227 and duplicated signal 241. In one embodiment, echo canceller 242 is embodied as a differential analog adder.

The output of echo canceller 242 is connected to an equalizer 238 to compensate for attenuation of a receiving signal sent from a counterpart transceiver. Different frequency components of the receiving signal experience different levels of attenuation as the signal is sent from the other device to the chip die 200 over a signal path. Therefore, equalizer 238 amplifies different frequency components of the receiving signal by different amplification factors to generate an equalized version 237 of the receiving signal.

Equalized receiving signal 237 is then fed to de-serializer 230 to generate an output signal. The output signal is sent to other components of the electronic device via pads of chip die 200 and corresponding pins of the chip package 140 (not illustrated). In other embodiments, data output circuit other than de-serializer may be used.

Termination 226 may also be provided between main driver 224 and pad 244 to prevent reflection of the receiving signal. Termination 226 provides impedance matching of the input impedance of main driver of transceiver 120A with the output impedance of main driver of transceiver 120B. The impedance matching prevents reflection of the signal transmitted between the IC packages 140A, 140B, and thereby increases the accuracy of the data transmission.

Also, in order to enhance the accuracy of the data transmission, it is advantageous to generate duplicate signal 241 that closely matches sending signal 227. As duplicated signal 241 becomes closer to sending signal 227, difference signal $V_{243}$ becomes a closer representation of the receiving signal sent by the other electronic device. To render duplicated signal 241 closer to sending signal 227, it is advantageous to use dummy driver 240 having properties (e.g., impedance and gain) close to those of main driver 224. Although the amplitude of sending signal 227 and duplicated signal 241 is relatively easy to match, it is more difficult to match the rising and falling edges of sending signal 227 and duplicated signal 241 because, among other reasons, (i) the difference of load of main driver 224 and load of dummy driver 240 and (ii) reflection of signals caused by impedance mismatch in the transmission line.

Specifically, main driver 224 in FIG. 2 generally has higher load compared to dummy driver 240 because sending signal 227 passes through pad 244, bonding 248, pin 252, PCB T-lines 130A, 130B, passive circuits 126A, 126B, connectors 124A, 124B and physical medium 150 to a counterpart IC chip die whereas dummy driver 240 outputs duplicated signal 241 directly to an input node of echo canceller 242. Therefore, duplicated signal 241 tends to rise and fall faster than sending signal 227, as described below with reference to FIGS. 3A through 3C. Moreover, sending signal 227 may be reflected back to main driver 224 from a counterpart transceiver due to impedance mismatch. Such impedance mismatch causes voltage level at pad 244 to fluctuate based on reflected signal components, and hence, causes increased deviation of difference signal $V_{243}$ from the receiving signal.

Figure 3A:
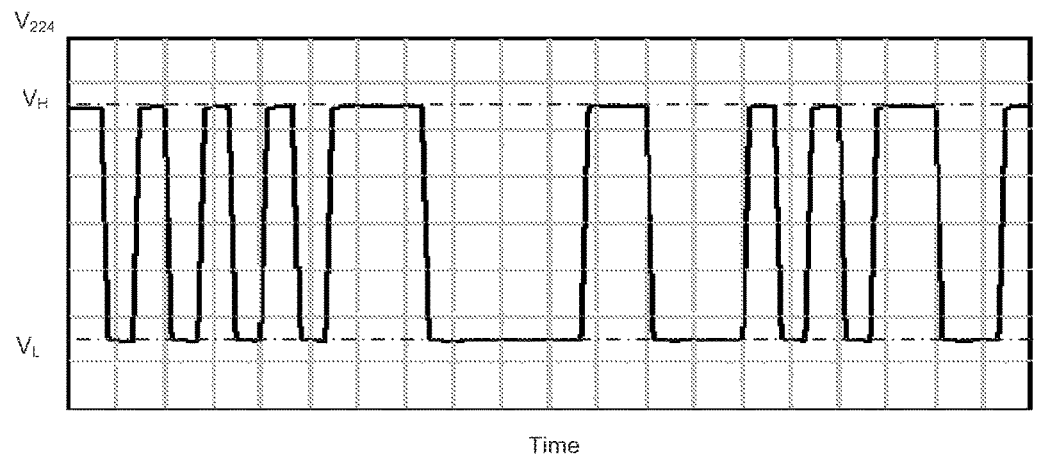
FIG. 3A is a timing diagram of a sending signal generated by a main driver in the IC package of FIG. 2, according to one embodiment

FIG. 3A is a timing diagram of sending signal 227 generated by main driver 224 in the chip package 140 of FIG. 2 where impedance was matched to avoid signal reflection, according to one embodiment. Sending signal 227 fluctuates between a high voltage level $V_H$ and a low voltage level $V_L$ over a time frame according to the input signal from serializer 220. The rise times and fall times of sending signal 227 may be impacted by the load of main driver 224, properties of a path between main driver 224 and a counterpart transceiver, and frequency components of the sending signal 227

Figure 3B:
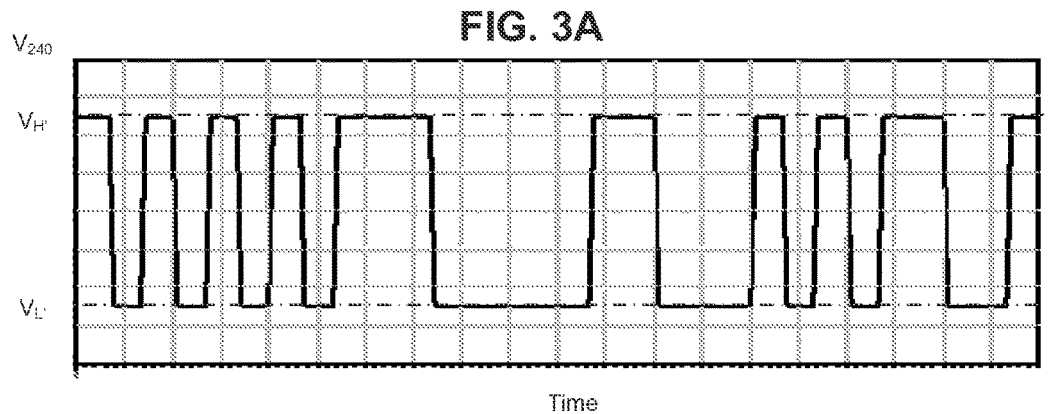
FIG. 3B is a timing diagram of a duplicated signal generated by a dummy driver in the IC package of FIG. 2, according to one embodiment.

FIG. 3B is a timing diagram of duplicated signal 241 generated by dummy driver 240 in the chip package 140 of FIG. 2, according to one embodiment. Duplicated signal 241 closely replicates sending signal 227 to fluctuate between a high voltage level $V_{H'}$ and a low voltage level $V_{L'}$ over substantially the same time frame according to the input signal from serializer 220. High voltage level $V_{H'}$ and low voltage level $V_{L'}$ may be substantially the same as high voltage level $V_H$ and low voltage level $V_L$, respectively. As set forth above with reference to FIG. 2, however, the rising times and falling times of duplicated signal 241 may deviate from the rising times and falling times of sending signal 227 due to difference, for example, in the load of the dummy driver 240 and the load of main driver 224 even absent reflection of sending signal 227 along the signal path.

Figure 3C:
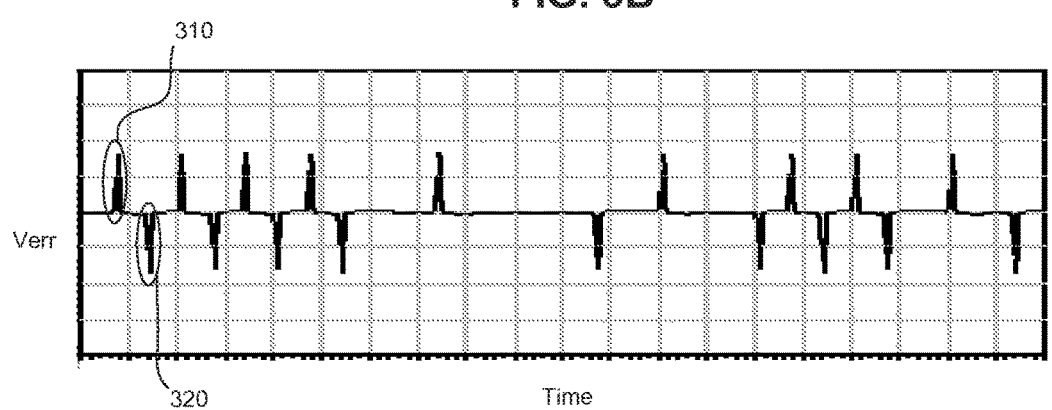
FIG. 3C is a timing diagram indicating an error signal representing discrepancy between the sending signal of FIG. 3A and the duplicated signal of FIG. 3B, according to one embodiment.

FIG. 3C is a timing diagram indicating an error signal Verr between sending signal 227 of FIG. 3A and duplicated signal 241 of FIG. 3B, according to one embodiment. Due to the difference in the rising times and falling times of sending signal 227 and duplicated signal 241, positive voltage spikes 310 and negative voltage spikes 320 occur in error signal Verr. The error signal Verr is added to attenuated version of the received signal, resulting in a difference signal $V_{243}$ that deviates from the received signal.

Figure 4A:
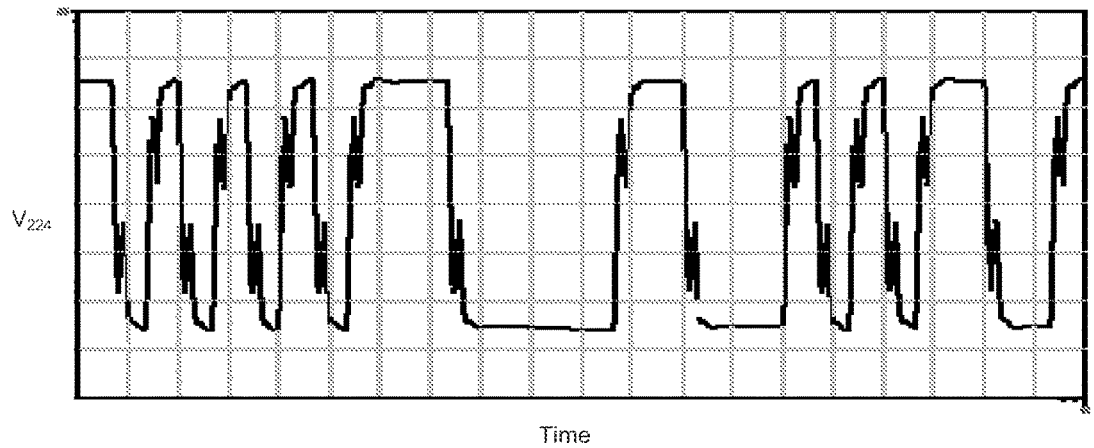
FIG. 4A is a timing diagram of a sending signal generated by a main driver in the IC package of FIG. 2 when experiencing reflection due to impedance mismatch, according to one embodiment.
Figure 4B:
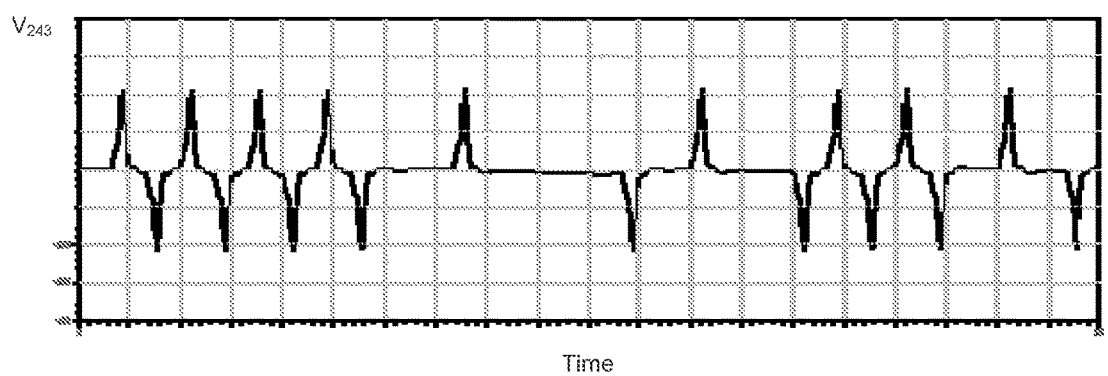
FIG. 4B is a timing diagram indicating an error signal between the sending signal of FIG. 4A and the duplicated signal of FIG. 3B, according to one embodiment.

FIG. 4A is a timing diagram of sending signal generated by main driver 224 in the chip package 200 of FIG. 2 when experiencing reflection of the sending signal, according to one embodiment. Due to the reflection, sending signal 227 is more distorted in FIG. 4A compared to sending signal 227 of FIG. 3A. Consequently, a timing diagram of FIG. 4B indicating a difference voltage Verr between the sending signal of FIG. 4A and the duplicated signal of FIG. 3B has more pronounced voltage spikes.

As shown in FIGS. 3A through 3C, 4A and 4B, difference voltage Verr has pronounced spikes especially at rising edges and falling edges of sending signal 227. Such spikes increase the deviation of the difference signal $V_{243}$ from the received signal, rendering the detection of received signal at de-serializer 230 inaccurate. To enhance the accuracy of detecting the received signal, it is advantageous to generate duplicated signal 241 that closely matches sending signal 227 in terms of the waveform as well as the rise times and fall times.

Figure 5A:
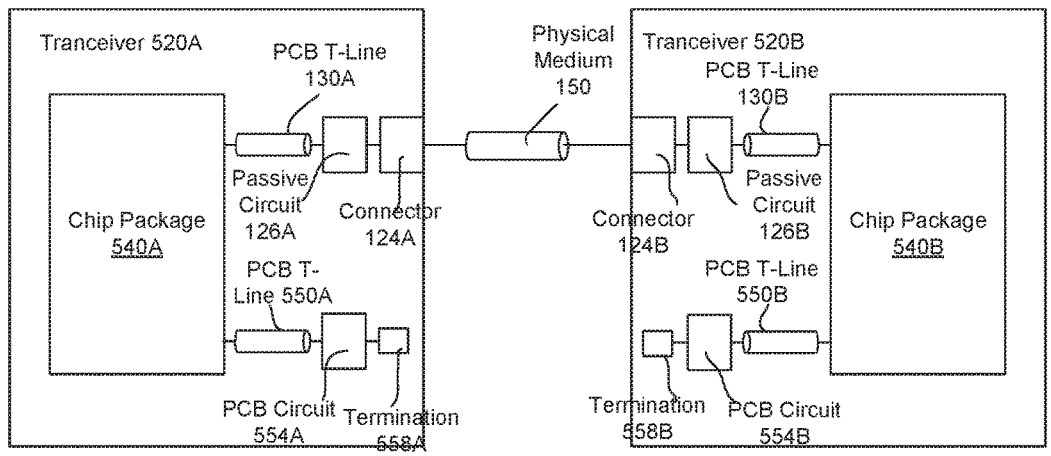
FIGS. 5A and 5B are block diagrams of enhanced full-duplex communication systems, according to one embodiment.
Figure 5B:
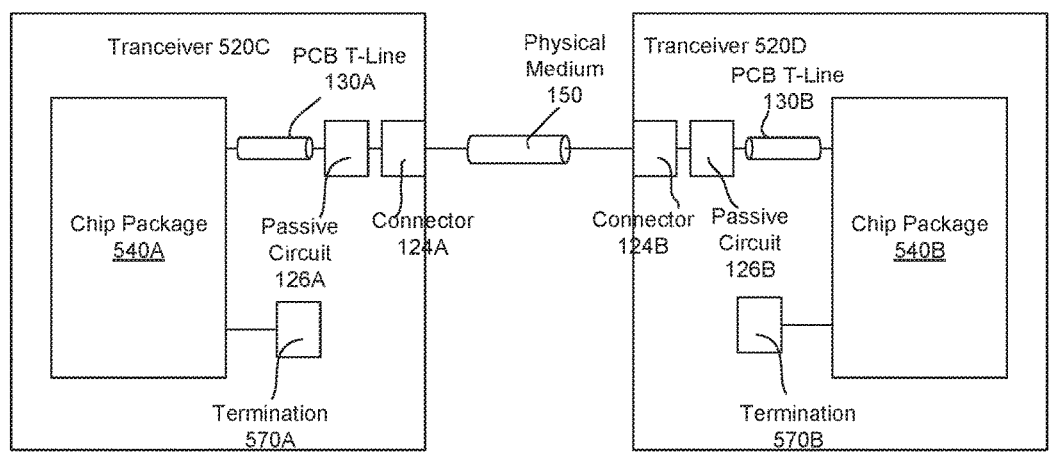

FIGS. 5A and 5B are block diagrams of enhanced full-duplex communication systems, according to one embodiment. Transceiver 520A includes a transceiver IC package 540A, printed circuit PCR T-line 130A, a passive PCB circuit 126A and a connector 124A connected to physical medium 150. Transceiver 520B also includes a transceiver IC package 540B, PCB T-line 130B, a passive PCB circuit 126B, and a connector 124B connected to physical medium 150. The structure, functions and operations of PCB T-lines 130A, 130B, passive PCB circuits 126A, 126B, connectors 124A, 124B and physical medium 150 in FIGS. 5A and 5B are the same as those of FIG. 1, and therefore, detailed description thereof is omitted herein for the sake of brevity.

Compared to full-duplex communication system 100 of FIG. 1, the full-duplex communication systems of FIGS. 5A and 5B include additional signal paths in transceivers 520A, 520B as well as additional pins for connecting dummy drivers to these additional signal paths. Specifically, transceiver 520A of FIG. 5A includes an additional signal path that is comprised of PCB T-line 550A, a passive PCB circuit 554A and termination 558A. Similarly, transceiver 520B of FIG. 5B has an additional signal path that includes PCB T-line 550B, a passive PCB circuit 554B and termination 558B.

PCB T-line 550A and passive PCB circuit 554A have properties that are substantially the same as the properties of PCB T-line 130A and passive PCB circuit 126A. Further, termination 558A has transmission properties and RLC properties that are substantially the same as the properties of a termination in a chip package 540B connected to a main driver of chip package 540B.

Similarly, PCB T-line 550B and passive PCB circuit 554B have properties that are substantially the same as those of PCB T-line 130B and passive PCB circuit 126B. Further, termination 558B has transmission properties and RLC properties that are substantially the same as the properties of a termination in a chip package 540A connected to a main driver of chip package 540A.

In one embodiment, the properties of terminations 558A, 558B are determined by simulating or experimenting signal transmission to chip package 540B, 540A. Based on the parameters determined from the simulation or experiment, property values of the terminations 558A, 558B may be set for use in actual circuits.

Figure 6:
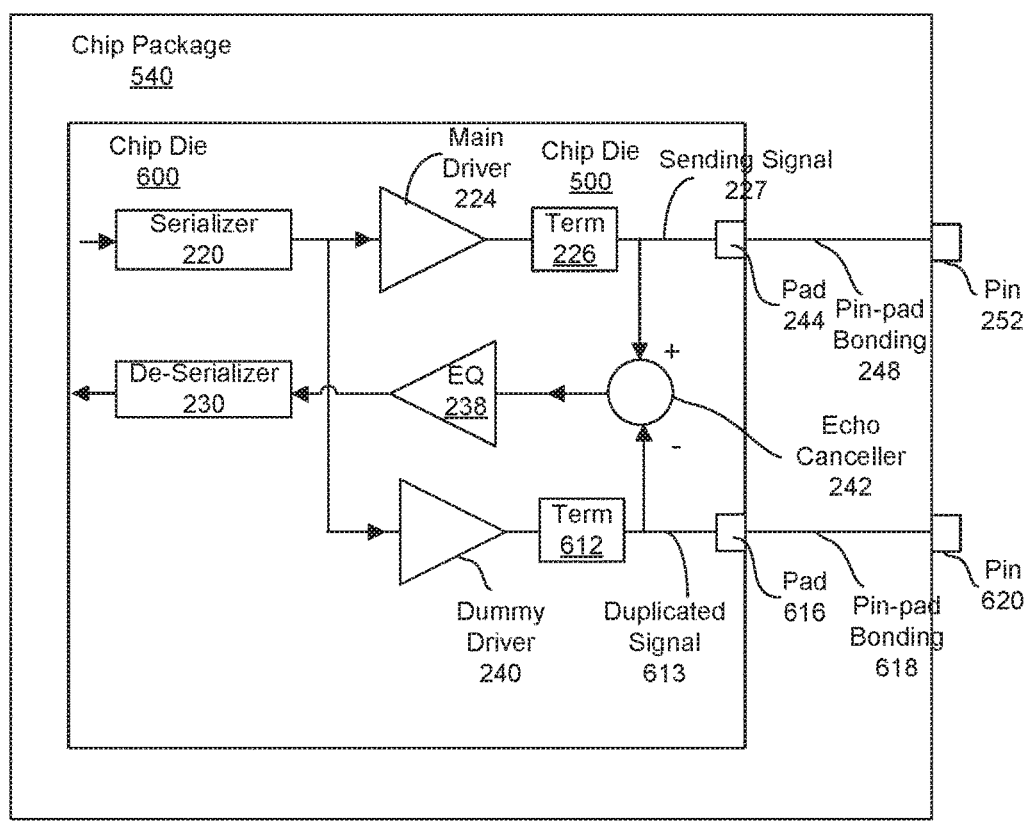
FIG. 6 is a block diagram of a transceiver IC package of FIG. 5, according to one embodiment.

Referring to FIG. 6, an IC package 540 in transceivers 520A, 520B includes a chip die 600, pin-pad bonding 248, 618 and pins 252, 620. Chip die 540 is substantially the same as chip die 200 of FIG. 2 except that a dummy driver 240 is connected to a pin 620 via termination 612 and that termination 612 is connected to pad 616 via pin-pad bonding 618. Termination 612 has properties (e.g., transmission properties and LRC properties) substantially the same as those of termination 226. Properties of pad 616, pin-pad bonding 618 and pin 620 have properties substantially the same as properties of pad 244, pin-pad bonding 248 and pin 252. In addition, the pin 620 is connected to termination 558A (or 558B) via PCB T-line 550A (or 550B) and passive PCB circuit 558A (or 558B).

Because signal paths coupled to main driver 224 and dummy driver 240 have substantially the same properties, dummy driver 240 experiences substantially the same load as main driver 224 as well as experience similar reflection of signals. Therefore, duplicated signal 613 generated by dummy driver 240 of FIG. 6 better matches sending signal 227 compared to duplicated signal 241 of FIG. 2.

Chip die 540 may include, among other components, a serializer 220, a de-serializer 230, a main driver 224, termination 226, an equalizer 238, an echo canceller 242, and a pad 244. These components of chip die 540 have the same structure and functions as components of chip die 200 described above with reference to FIG. 2, and therefore their description is omitted herein for the sake of brevity.

Figure 7:
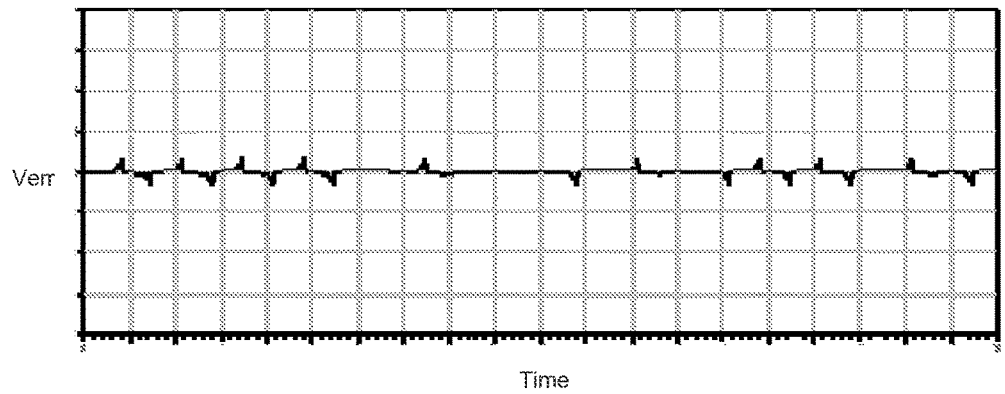
FIG. 7 is a timing diagram indicating an error signal representing discrepancy between the sending signal and a duplicated signal generated by a dummy driver of FIG. 6, according to one embodiment.

FIG. 7 is a timing diagram indicating error signal Verr representing discrepancy between sending signal 227 and duplicated signal 613 generated by dummy driver 240 of FIG. 6, according to one embodiment. Because duplicated signal 613 of FIG. 6 has a waveform and rising/falling edges that more closely resembles sending signal 227 compared to duplicated signal 241 of FIG. 2, voltage spikes in error signal Verr of FIG. 7 have a smaller amplitude compared to voltage spikes in error signal Verr of FIG. 3C.

Figure 8:
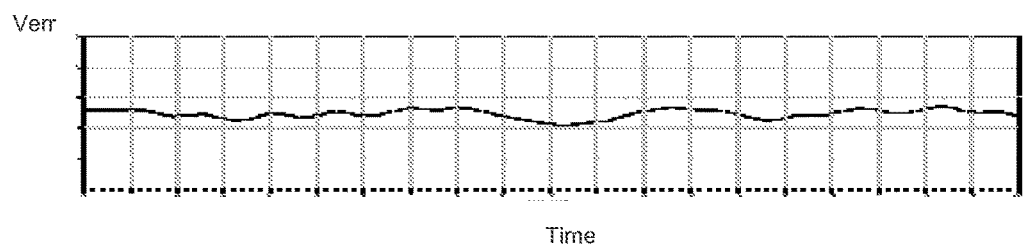
FIG. 8 is a timing diagram indicating an error signal representing discrepancy between the sending signal and a duplicated signal generated by a dummy driver of FIG. 6 when experiencing reflection of signals, according to one embodiment.

FIG. 8 is a timing diagram indicating error signal Verr representing discrepancy between the sending signal 227 and duplicated signal 613 generated by dummy driver 240 of FIG. 6 when experiencing reflection of the signals, according to one embodiment. Because dummy driver 240 experiences load essentially the same as main driver 224 and is connected to a signal path with properties similar to a signal path connected to main driver 224, the duplicated signal 613 includes reflected signal that is similar to reflected signal associate with sending signal 227. Therefore, duplicated signal 613 of FIG. 6 matches sending signal 227 better than duplicated signal 241 of FIG. 2. Accordingly, error signal Verr of FIG. 8 shows error signal Verr that does not show significant spikes.

Referring back to FIG. 5B, transceivers 520C, 520D are substantially the same as transceiver 520A, 520B except that terminations 570A, 570B are equivalent to terminations in chip packages 540A, 540B connected to main drivers in chip packages 540A, 540B. Termination 570A include circuit components (e.g., resistor, capacitor or inductor) to match properties of a termination in chip package 540B connected to a main driver in chip package 540B. Similarly, termination 570B also has properties that are substantially the same as the properties of a termination in chip package 540A connected to a main driver in chip package 540A. Terminations 570A, 570B enable dummy drivers to generate duplicated signals that better match sending signals generated by main drivers without having to provide actual circuits or components in the signal path between the main drivers of transceivers 520C, 520D.

Figure 9A:
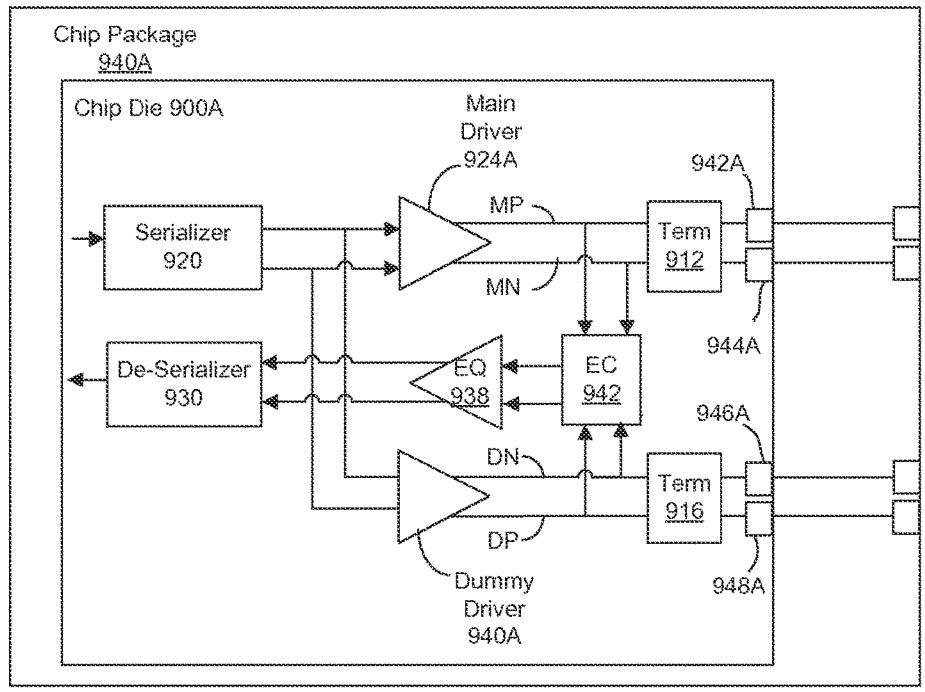
FIGS. 9A and 9B are block diagrams of chip packages for full-duplex communication systems using differential signals, according to embodiment.
Figure 9B:
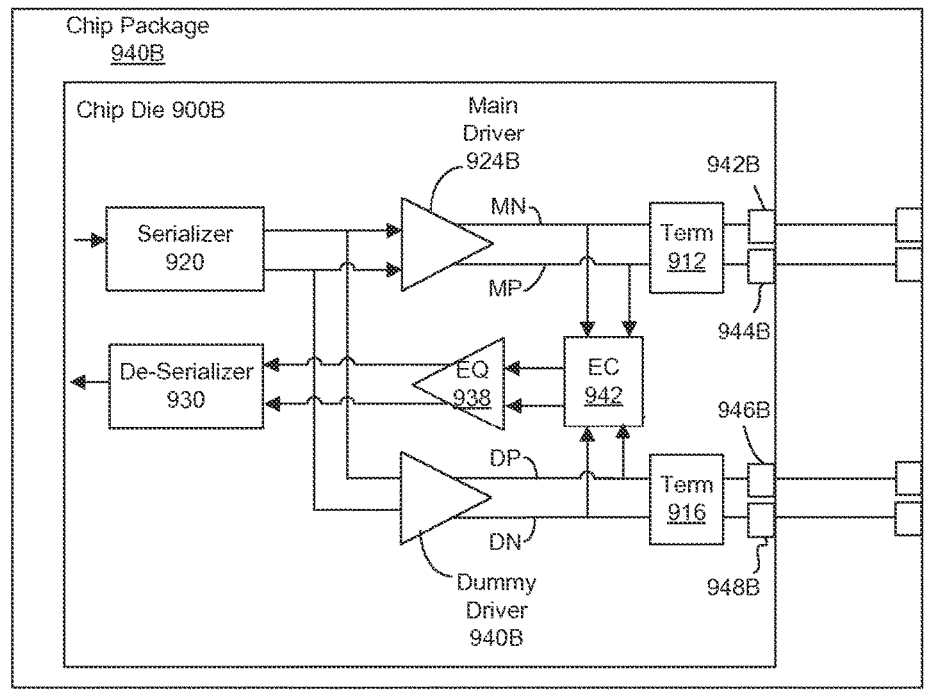

FIGS. 9A and 9B are block diagrams of chip packages 940A, 940B for full-duplex communication systems using differential signals, according to embodiment. Chip packages 940A, 940B have components and functions similar to those of chip package 540 of FIG. 6 but the components in chip packages 940A, 940B receive, process and output differential signals. Chip packages 940A, 940B include chip dies 900A, 900B, respectively.

Chip package 940A includes a serializer 920, a de-serializer 930, a main driver 924A, a dummy driver 940A, an error canceller 942, an equalizer 938, terminations 912, 916, and pads 942A, 944A, 946A, 948A. Functions of these components are essentially the same as serializer 220, de-serializer 230, main driver 224, dummy driver 240, error canceller 242, equalizer 242, terminations 226, 612, and pads 244, 616 of FIG. 6 except that the components of FIG. 9A handle differential signals.

In the embodiment of FIG. 9A, a positive signal MP is sent out at an positive output terminal of main driver 924A while a negative signal MN is sent out at a negative terminal of main driver 924A. Similarly, a positive signal DP is sent out at a positive output terminal of dummy driver 940A while a negative signal DN is sent out at a negative output terminal of dummy driver 940A. A signal line for transmitting negative signal MN is adjacent to another signal line for transmitting negative signal DN while signal lines for transmitting positive signals MP, DP are located at beyond the signal lines for MN and DN. That is, the signal lines are arranged in the sequence of a line for MP, a line for MN, a line for DN and a line for DP. By increasing the distance between the signal lines of opposite polarity (i.e., MP line v. DN line and MN line v. DP line), interference between the signals can be reduced.

The sequence of the signal lines may extend to the pin-pad bonds, pins and subsequent electronic components in the transceiver to further reduce interference between the signals.

Chip package 940B is substantially the same as chip package 940A except that the sequence of signal lines for transmitting signals are switched. That is, the signal lines for transmitting negative signals MN, DN are located at beyond the signal lines for MP, DP of the chip die 900B. That is, the signal lines are arranged in the sequence of a line for MN, a line for MP, a line for DP and a line for DN. Interference between signals can also be reduced by increasing the distance between the signal lines of opposite polarity (i.e., MP line v. DN line and MN line v. DP line).

Figure 10:
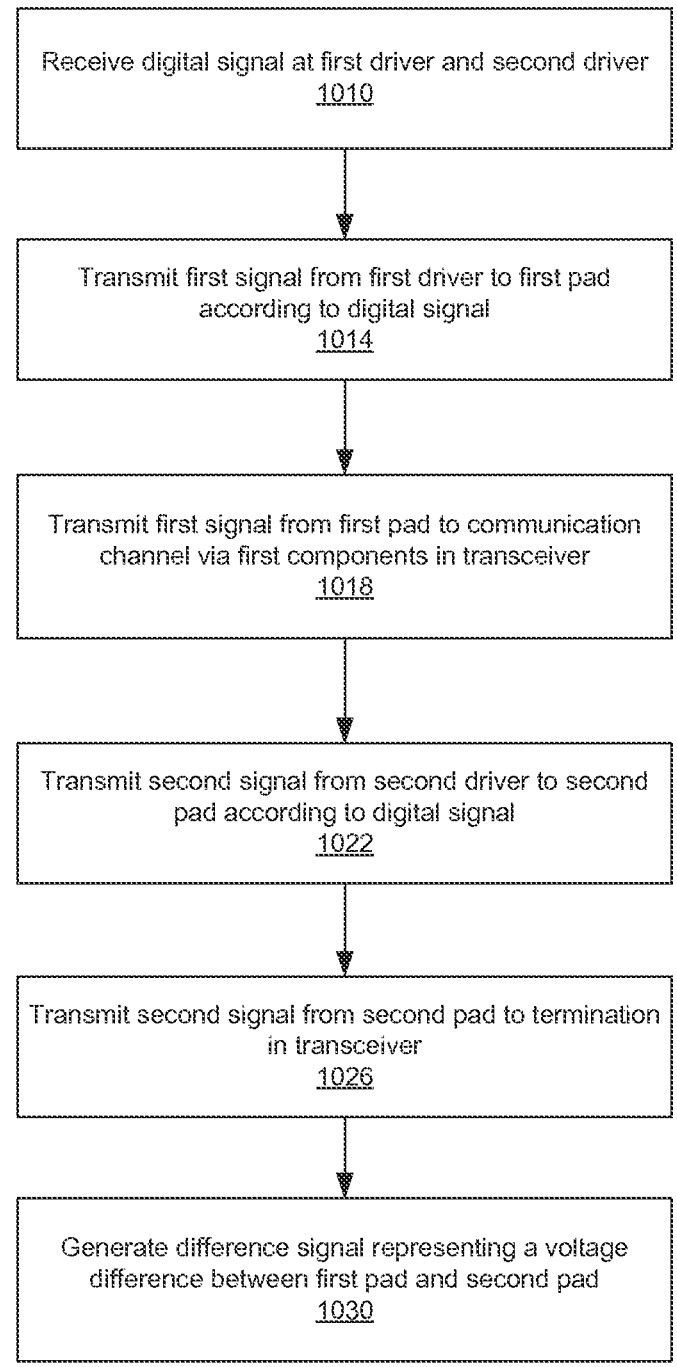
FIG. 10 is a flowchart illustrating a process of performing enhanced full-duplex communication, according to one embodiment.

FIG. 10 is a flowchart illustrating a method of performing full-duplex communication, according to one embodiment. A digital signal is received 1010 from a data input circuit at a first driver and a second driver in a full-duplex transceiver. A first signal is transmitted 1014 from the first driver to a first pad of a chip die in the chip package of the transceiver according to the digital signal.

The first signal is transmitted 1018 from the first pad to a communication channel between the full-duplex transceiver and a counterpart full-duplex transceiver via first components in the full-duplex transceiver.

A second signal is transmitted 1022 from the second driver to a second pad of a chip die in the chip package of the transceiver according to the digital signal. The second signal is transmitted 1026 from the second pad to a termination in the full-duplex transceiver.

A difference signal representing a voltage difference between the first pad and the second pad is generated 1030 by an echo cancellation circuit. The difference signal may be processed to extract a receiving signal that is sent from the counterpart full-duplex transceiver.

The steps and sequence of steps described above with reference to FIG. 10 is merely illustrative. For example, transmitting 1014 of first signal may be performed in parallel with transmitting of second signal 1022 instead of sequentially performing these processes. Further, instead of generating 1030 a difference signal, a different signal may be generated to determine a signal received from the counterpart full-duplex transceiver.

Figure 11:
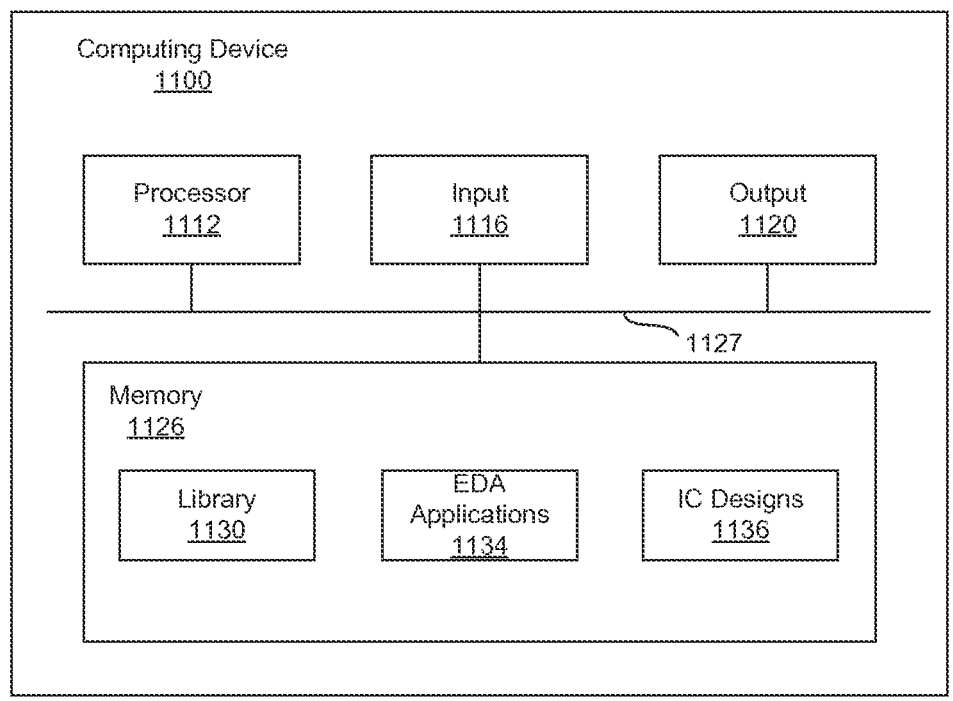
FIG. 11 is a block diagram of a computing device for performing designing operations associated with an integrated circuit in a full-duplex transceiver, according to one embodiment.

FIG. 11 is a block diagram of a computing device 1100 for performing designing operations associated with integrated circuit in a full-duplex transceiver, according to one embodiment. The computer device 1100 may include, among other components, a processor 1112, an input module 1116, an output module 1120, a memory 1126 and a bus 1127 for connecting these components. The processor 1112 executes instructions stored in the memory 1126. The input module 1116 may include various devices for receiving user input, including keyboards and pointing devices (e.g., mouse and touch screen). The output module 520 includes a display device or interface device for communicating with the display device.

The memory 1126 is a non-transitory computer readable storage medium storing, among others, library 1130, electronic design automation (EDA) applications 1134 and integrated circuit (IC) designs 1136. The library 1130 may include data on various circuit components, including instances of integrated circuits describe herein. The EDA applications 1134 may include various software programs for designing ICs, including place and route tools, synthesis tools, and verification tools. The design processed by the EDA applications 1134 may be stored in IC designs 1136. The IC designs 1136 may be an entire operational circuit or a part of a larger IC circuit.

Embodiments described herein are merely illustrative. Various other embodiments may be used using the principle described herein.

What is claimed is:

1. A full-duplex transceiver, comprising:
an integrated circuit package comprising:
a first driver coupled to a data input circuit to receive a digital signal and generate a first signal to a first pad according to the received digital signal, the first pad coupled to a communication channel between the full-duplex transceiver and a counterpart full-duplex transceiver,
a second driver coupled to the data input circuit to receive the digital signal and generate a second signal corresponding to the first signal to a second pad according to the digital signal received from the data input, the second pad coupled to a termination in the full-duplex transceiver, and
an echo cancellation circuit having an output, a first input coupled to the first pad, and a second input coupled to the second pad, the echo cancellation circuit configured to generate at the output a difference signal representing a voltage difference between the first pad and the second pad;
first components between the communication channel and the first pad; and
second components between the second pad and the termination.

2. The full-duplex transceiver of claim 1, wherein the first components comprise conductive element between the first pad and a first pin of the integrated circuit package, and wherein the second components comprise conductive element between the second pad and a second pin of the integrated circuit package.

3. The full-duplex transceiver of claim 2, wherein the first components further comprise (i) a first printed circuit board (PCB) trace, (ii) first passive circuit elements connected to the first PCB trace and (iii) a connector between the first passive circuit elements and the communication channel, wherein the second components further comprise (i) a second printed circuit board (PCB) trace and (ii) second passive circuit elements between the second PCB trace and the termination.

4. The full-duplex transceiver of claim 3, wherein a transmission line parameter and a Resistor, Inductor and Capacitor (RLC) parameter of the termination are same as a transmission line parameter and a RLC parameter of a termination in an integrated package of a counterpart full-duplex transceiver connected to a driver of the counterpart full-duplex transceiver corresponding to the first driver of the full-duplex transceiver.

5. The full-duplex transceiver of claim 3, wherein each of the first and second passive circuit elements comprise at least one of an electrostatic discharge protection circuit, and a common mode choke (CMC) circuit.

6. The full-duplex transceiver of claim 1, further comprising an equalizer coupled to the output of the echo cancellation circuit, the equalizer configured to (i) compensate for attenuation of a receiving signal included in the difference signal and (ii) provide a compensated version of the receiving signal to a data output circuit.

7. The full-duplex transceiver of claim 6, wherein the data input circuit comprises a serializer and the data output circuit comprises a de-serializer.

8. The full-duplex transceiver of claim 1, wherein a transmission line parameter and a Resistor, Inductor and Capacitor (RLC) parameter of the termination are same as a transmission line parameter and a RLC parameter of a termination in an integrated package of a counterpart full-duplex transceiver connected to a driver of the counterpart full-duplex transceiver corresponding to the first driver of the full-duplex transceiver.

9. The full-duplex transceiver of claim 1, wherein each of the first driver and the second driver includes differential outputs.

10. The full-duplex transceiver of claim 9, wherein a negative output of the first driver and a negative output of the second driver are placed between a positive output of the first driver and a positive output of the second driver.

11. The full-duplex transceiver of claim 9, wherein a positive output of the first driver and a positive output of the second driver are placed between a negative output of the first driver and a negative output of the second driver.

12. A method of performing full-duplex communication, comprising:
receiving a digital signal from a data input circuit at a first driver and a second driver in a full-duplex transceiver;
transmitting a first signal from the first driver to a first pad according to the digital signal;
transmitting the first signal from the first pad to a communication channel between the full-duplex transceiver and a counterpart full-duplex transceiver via first components in the full-duplex transceiver;
transmitting a second signal from the second driver to a second pad according to the digital signal;
transmitting the second signal from the second pad to a termination in the full-duplex transceiver; and
generating a difference signal representing a voltage difference between the first pad and the second pad by an echo cancellation circuit.

13. The method of claim 12, wherein the first components comprise conductive element between the first pad and a first pin of an integrated circuit package in the full-duplex transceiver, and wherein the second components comprise conductive element between the second pad and a second pin of the integrated circuit package.

14. The method of claim 13, wherein the first components further comprise (i) a first printed circuit board (PCB) trace, (ii) first passive circuit elements connected to the first PCB trace and (iii) a connector between the first passive circuit elements and the communication channel, wherein the second components further comprise (i) a second printed circuit board (PCB) trace and (ii) second passive circuit elements between the second PCB trace and the termination.

15. The method of claim 14, wherein a transmission line parameter and a Resistor, Inductor and Capacitor (RLC) parameter of a signal path comprising (i) the first components, (ii) the communication channel and (iii) third components in the counterpart full-duplex transceiver match a transmission line parameter and a RLC parameter of the second components, the third components placed between the communication channel and a third driver in the counterpart full-duplex transceiver corresponding to the first driver.

16. The method of claim 12, further comprising:
compensating for attenuation of a receiving signal included in the difference signal by an equalizer; and
providing a compensated version of the receiving signal from the equalizer to a data output circuit.

17. The method of claim 16, wherein the data input circuit comprises a serializer and the data output circuit comprises a de-serializer.

18. The method of claim 12, wherein each of the first driver and the second driver includes differential outputs.

19. A non-transitory computer readable storage medium storing digital representation of an integrated circuit for a full-duplex transceiver, the integrated circuit comprising:
a first driver coupled to a data input circuit to receive a digital signal and generate a first signal to a first pad according to the received digital signal, the first pad coupled to a communication channel between the full-duplex transceiver and a counterpart full-duplex transceiver;
a second driver coupled to the data input circuit to receive the digital signal and generate a second signal corresponding to the first signal to a second pad according to the digital signal received from the data input, the second pad coupled to a termination in the full-duplex transceiver; and
an echo cancellation circuit having an output, a first input coupled to the first pad, and a second input coupled to the second pad, the echo cancellation circuit configured to generate at the output a difference signal representing a voltage difference between the first pad and the second pad.

20. The non-transitory computer storage medium of claim 19, wherein the first pad is configured for bonding to a first pin of an integrated circuit package including the integrated circuit, and the second pad is configured for bonding to a second pin of the integrated circuit package.

* * * * *